(12) United States Patent
Kim et al.

(10) Patent No.: US 7,887,950 B2
(45) Date of Patent: Feb. 15, 2011

(54) LITHIUM SECONDARY BATTERY

(75) Inventors: Hyoungsu Kim, Suwon-si (KR); Soonki Woo, Suwon-si (KR); Yongtae Kim, Suwon-si (KR); Jongku Kim, Suwon-si (KR); Sangbong Nam, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 537 days.

(21) Appl. No.: 11/481,793

(22) Filed: Jul. 7, 2006

(65) Prior Publication Data

US 2007/0015046 A1    Jan. 18, 2007

(30) Foreign Application Priority Data

Jul. 11, 2005   (KR) ...................... 10-2005-0062219

(51) Int. Cl.
*H01M 2/12* (2006.01)
(52) U.S. Cl. .................. 429/185; 429/231.95
(58) Field of Classification Search .................. 429/56, 429/82, 174, 231.95, 163, 176, 177, 185, 429/231.8, 53, 61
See application file for complete search history.

(56) References Cited

U.S. PATENT DOCUMENTS

| | | | | |
|---|---|---|---|---|
| 4,610,370 A | * | 9/1986 | Patterson et al. | 220/203.08 |
| 5,747,187 A | * | 5/1998 | Byon | 429/58 |
| 6,207,319 B1 | | 3/2001 | Nam | |
| 2007/0134547 A1 | * | 6/2007 | Bouffard et al. | 429/56 |

FOREIGN PATENT DOCUMENTS

| | | |
|---|---|---|
| JP | 2000-173565 | 6/2000 |
| JP | 2000-357495 | 12/2000 |
| JP | 2001-006635 | 1/2001 |

* cited by examiner

*Primary Examiner*—Jennifer Michener
*Assistant Examiner*—Monique Wills
(74) *Attorney, Agent, or Firm*—Christie, Parker & Hale, LLP (57) ABSTRACT

A lithium secondary battery has protrusions or depressions formed on a surface of a gasket, which makes contact with a safety vent, so that gas, which is generated inside the battery, and an electrolyte, do not leak, thereby improving the safety.

17 Claims, 7 Drawing Sheets

LITHIUM SECONDARY BATTERY

CROSS-REFERENCE TO RELATED APPLICATIONS

This application claims the benefit of Korean Application No. 2005-62219, filed Jul. 11, 2005 in the Korean Intellectual Property Office, the disclosure of which is incorporated herein by reference.

BACKGROUND OF THE INVENTION

1. Field of the Invention

Aspects of the present invention relate to a lithium secondary battery, and more particularly, to a cylinder-type lithium secondary battery having protrusions or depressions formed on a surface of a gasket, which makes contact with a safety vent, so that gas, which is generated inside the battery, and an electrolyte, do not leak, thereby improving the safety of the battery.

2. Description of the Related Art

As generally known in the art, lithium secondary batteries are classified into cylinder-type lithium secondary batteries and square-type lithium secondary batteries according to their appearance. For improved safety, the cylinder-type lithium secondary batteries have a cap assembly adapted to interrupt the current flowing inside the batteries and stop reactions when the internal pressure reaches a critical level and a danger of explosion exists due to overcharging or malfunctioning of the batteries.

Figure 1:
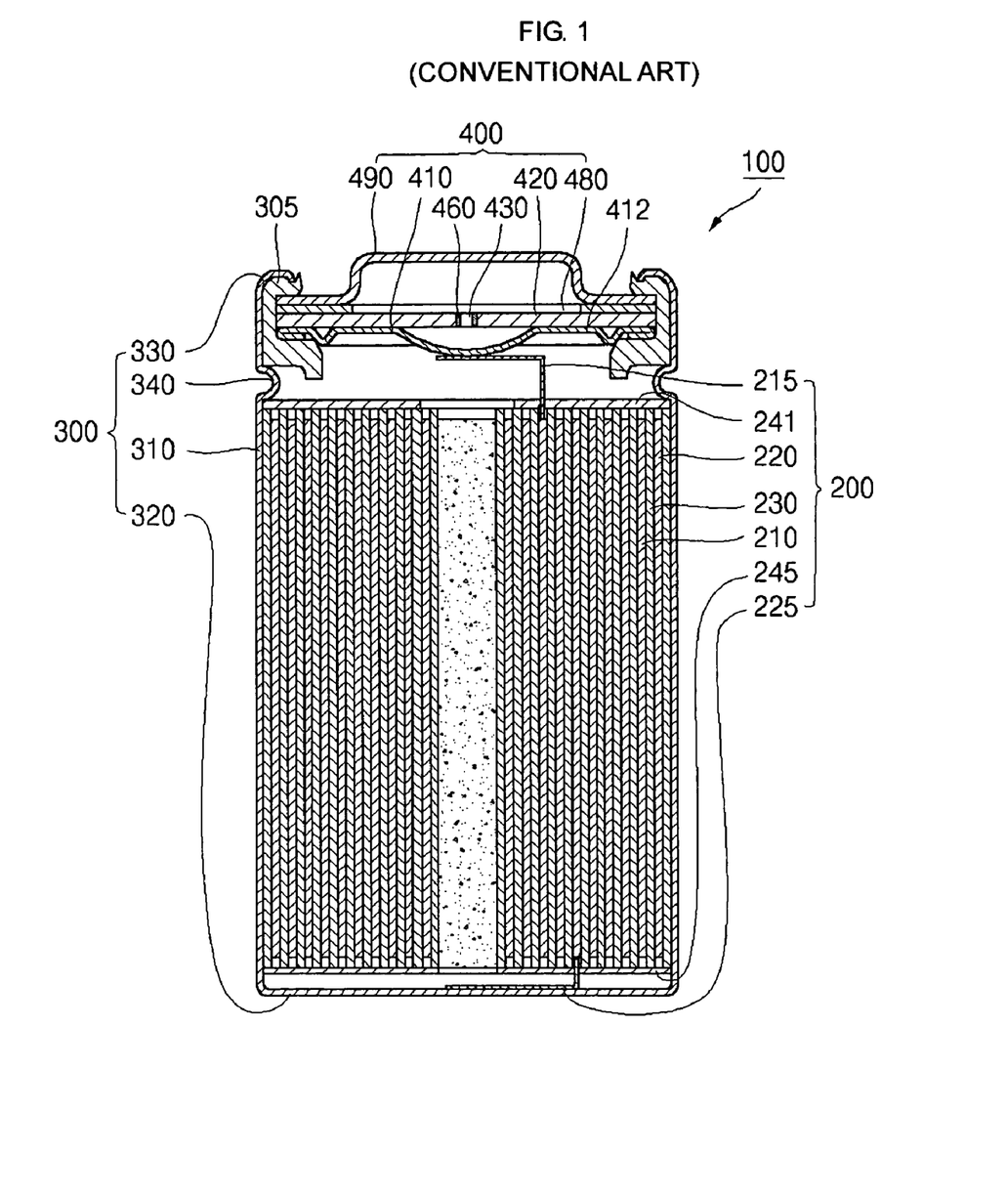
FIG. 1 is a sectional view showing a conventional cylinder-type lithium secondary battery.

Referring to FIG. 1, a cylinder-type lithium secondary battery 100 includes an electrode assembly 200, a cylindrical can 300 for containing the electrode assembly 200 together with an electrolyte, and a cap assembly 400 assembled to the top of the cylindrical can 300 so as to seal it and allow current, which is generated by the electrode assembly 200, to flow to an external device.

The electrode assembly 200 is formed by winding a positive electrode plate 210, which has a positive electrode collector coated with positive electrode active materials on its surface, a negative electrode plate 220, which has a negative electrode collector coated with negative electrode active materials on its surface, and a separator 230, which is positioned between the positive and negative electrode plates 210 and 220 so as to electrically insulate them from each other, into a jelly roll. Although not shown in detail in the drawing, the positive electrode plate 210 includes a positive electrode collector made of metal foil having excellent electric conductivity, such as aluminum (Al) foil, and positive electrode active materials covering both surfaces of the positive electrode collector. Predetermined regions of the positive electrode collector on both ends of the positive electrode plate 210 are not coated with the positive electrode active materials and define positive electrode uncoated regions. A positive electrode tab 215 is bonded to an end of the positive electrode uncoated regions. The positive electrode tab 215 is generally made of aluminum (Al) and protrudes a predetermined distance from the top of the electrode assembly 200.

The negative electrode plate 220 includes a negative electrode collector made of metal having electric conductivity, such as copper (Cu) or nickel (Ni) foil, and negative electrode active materials covering both surfaces of the negative electrode collector. Predetermined regions of the negative electrode collector on both ends of the negative electrode plate 220 are not coated with the negative electrode active materials and define negative electrode uncoated regions. A negative electrode tab 225 is bonded to an end of the negative electrode uncoated regions. The negative electrode tab 225 is generally made of nickel (Ni) and protrudes a predetermined distance from the bottom of the electrode assembly 200. The electrode assembly 200 may further include insulation plates 241 and 245 positioned on its top and bottom, respectively, so that contact with the electrode assembly 200 or the cylindrical can 300 is avoided.

The cylindrical can 300 includes a cylindrical lateral plate 310 having a predetermined diameter so as to define a space for receiving the cylindrical electrode assembly 200 and a lower plate 320 for sealing the bottom of the cylindrical lateral plate 310. The cylindrical lateral plate 310 has an open top so that the electrode assembly 200 can be inserted through it. The negative electrode tab 225 of the electrode assembly 200 is bonded to the center of the lower plate 320 of the cylindrical can 300, which then acts as a negative electrode. The cylindrical can 300 is generally made of aluminum (Al), iron (Fe), or an alloy thereof. The cylindrical can 300 has a clipping portion 330 formed on its upper end so as to bend inwards, in order to compress the top of the cap assembly 400, which is coupled to the upper opening of the can 300. A part of the cylindrical can 300, which is spaced from the clipping portion 330 in the downward direction by as much as the thickness of the cap assembly 400, is indented so as to form a beading portion 340, which compresses the bottom of the cap assembly 400.

The cap assembly 400 includes a safety vent 410, a current interruptor 420, a secondary protective device 480, and a cap-up 490. The safety vent 410 has the shape of a plate, the center of which protrudes downwards, and is positioned on the bottom of the cap assembly 400. The protrusion at the center of the safety vent 410 is deformed upwards by pressure occurring inside the secondary battery. One of the positive and negative electrode tabs 215 and 225, which are drawn from the positive and negative electrode plates 210 and 220, respectively, is welded to a predetermined portion of the lower surface of the safety vent 410 so that the safety vent 410 is electrically connected to a corresponding one of the positive and negative electrode plates 210 and 220 of the electrode assembly 200. The other of the positive and negative electrode plates 210 and 220 is electrically connected to the can 300 via a tab (not shown) or directly connected thereto.

In the case of a conventional cap assembly, it is customary to insert a gasket into a can, followed by a safety vent, a current interruptor, a secondary protective device, and a cap-up and subject the can to crimping so that gas, which is generated inside the battery, and an electrolyte, do not leak. However, such a conventional structure has a problem in that the attachment condition between the safety vent and the gasket may degrade, and when the battery's internal pressure rises, gas may leak from inside the battery due to the poor sealing condition. In addition, when the electrolyte penetrates into a narrow gap between the cap assembly and the gasket or between the gasket and the cap, due to external impact, for example, the electrolyte may leak out of the battery due to a capillary phenomenon or cohesion force, for example.

SUMMARY OF THE INVENTION

Accordingly, aspects of the present invention are provided in view of the above-mentioned and/or other problems occurring in the prior art, and include a lithium secondary battery having protrusions or depressions formed on a surface of a gasket, which makes contact with a safety vent or bead, so that gas, which is generated inside the battery, or an electrolyte does not leak thereby improving the sealing properties.

In accordance with an aspect of the present invention, shown is a lithium secondary battery including an electrode assembly, a container can to contain the electrode assembly, a cap assembly to top an opening of the can, the cap assembly having a safety vent, a current interruptor, and a cap-up coupled to a top of the current interruptor, the safety vent having a protrusion protruding downwards from a center, the protrusion being deformed upwards by internal pressure of the battery, a gasket positioned between the cap assembly and the can so as to maintain a seal, and a protrusion and/or depression formed on a part of a surface of the gasket, the part making contact with the safety vent.

The protrusion and/or depression may have a shape of a circle having a predetermined radius about a rotation center axis of the battery.

At least two protrusions and/or depressions may be formed.

The protrusion and/or depression may have a shape of an embossment.

The protrusion and/or depression may have a sectional shape selected from a semi-circle, a rectangle, and a triangle.

The lithium secondary battery may further include another protrusion and/or depression formed on a part of a lower surface of the gasket, the part making contact with a bead.

In accordance with another aspect of the present invention, shown is a lithium secondary battery including an electrode assembly, a container can to contain the electrode assembly, a cap assembly to top an opening of the can, the cap assembly having a safety vent, a current interruptor, and a cap-up coupled to a top of the current interruptor, the safety vent having a protrusion protruding downwards from a center, the protrusion being deformed upwards by internal pressure of the battery, a gasket positioned between the cap assembly and the can so as to maintain a seal, and a protrusion and/or depression formed on a part of a lower surface of the gasket, the part making contact with a bead.

The protrusion and/or depression may have a shape of a circle having a predetermined radius about a rotation center axis of the battery.

At least two protrusions and/or depressions may be formed.

The protrusion and/or depression may have a shape of an embossment.

The protrusion and/or depression may have a sectional shape selected from a semi-circle, a rectangle, and a triangle.

The gasket may be made of a material selected from polyethylene, polypropylene, and/or polyimide.

In accordance with another aspect of the present invention, shown is a battery, having a cap assembly, a container including a first end and a second end, and a gasket positioned between the cap assembly and the container on the first end, wherein the gasket includes at least one protrusion, depression, and/or embossing along a surface of the gasket so that any gas and/or electrolyte present between the gasket and the container and/or the gasket and the cap assembly travels along an extended path.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the aspects of the present invention, examples of which are illustrated in the accompanying drawings, wherein like reference numerals refer to the like elements throughout. The aspects are described below in order to explain the present invention by referring to the figures.

Figure 2A:
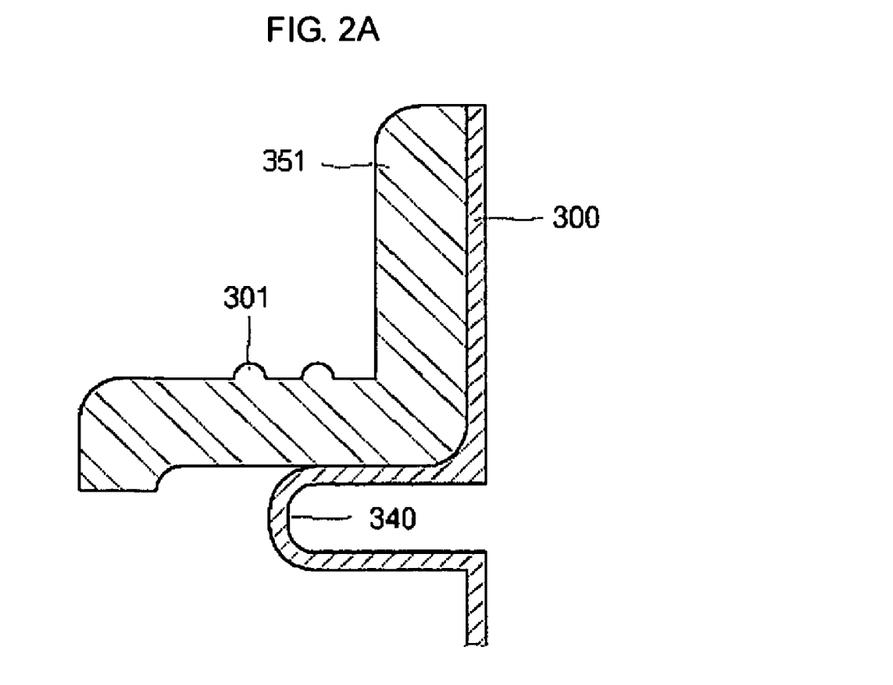
FIG. 2A is a sectional view showing a gasket according to an aspect of the present invention.
Figure 2B:
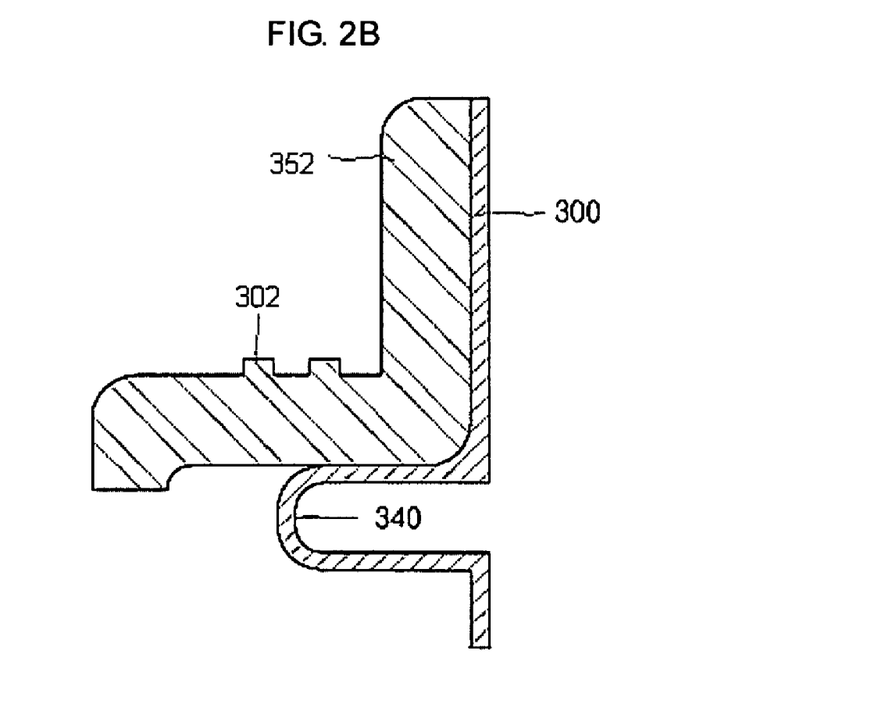
FIG. 2B is a sectional view showing a gasket according to another aspect of the present invention.
Figure 2C:
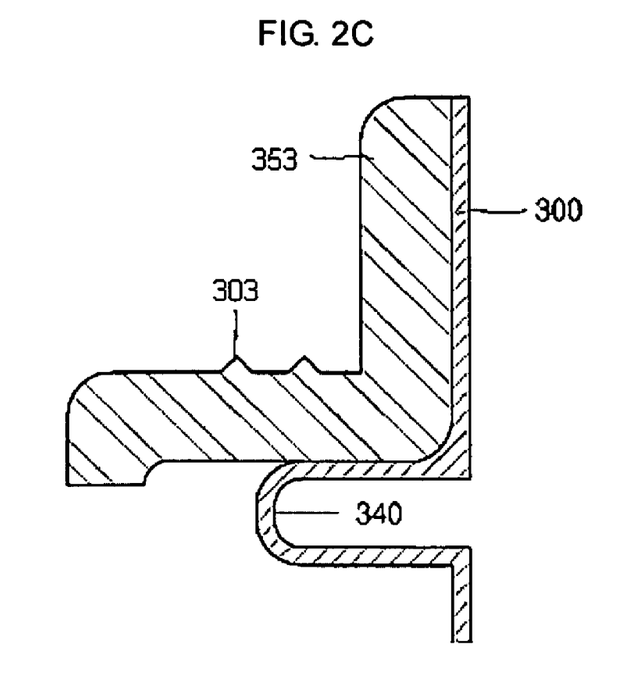
FIG. 2C is a sectional view showing a gasket according to another aspect of the present invention.
Figure 3A:
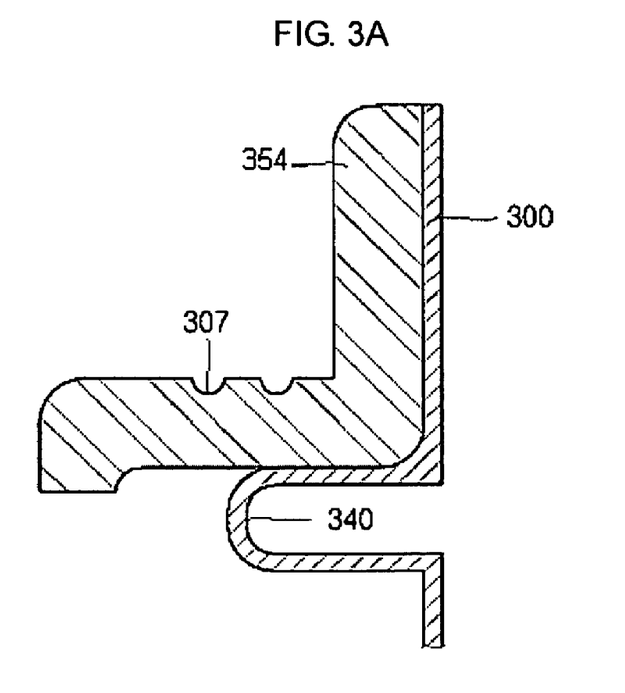
FIG. 3A is a sectional view showing a gasket according to another aspect of the present invention.
Figure 3B:
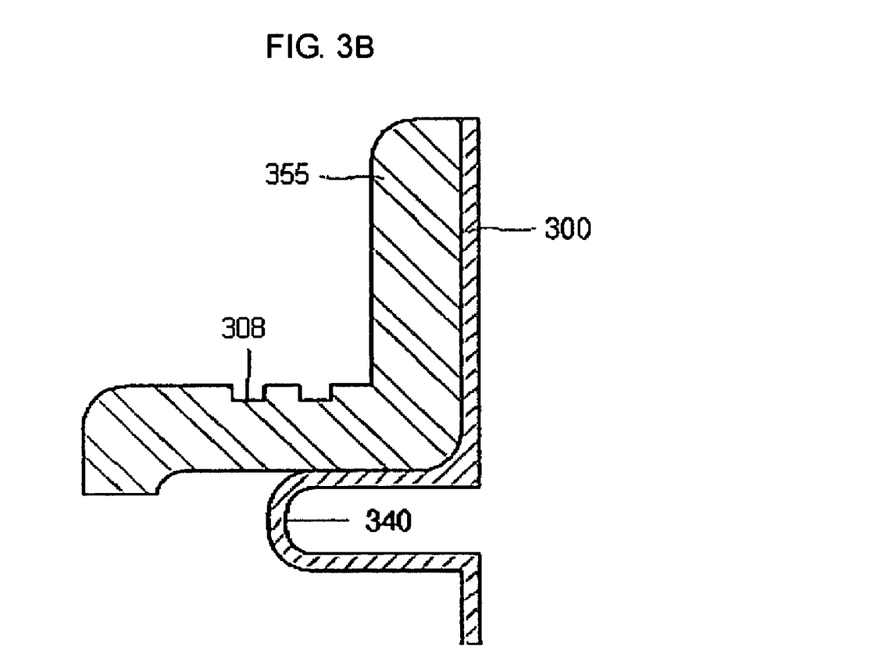
FIG. 3B is a sectional view showing a gasket according to another aspect of the present invention.
Figure 3C:
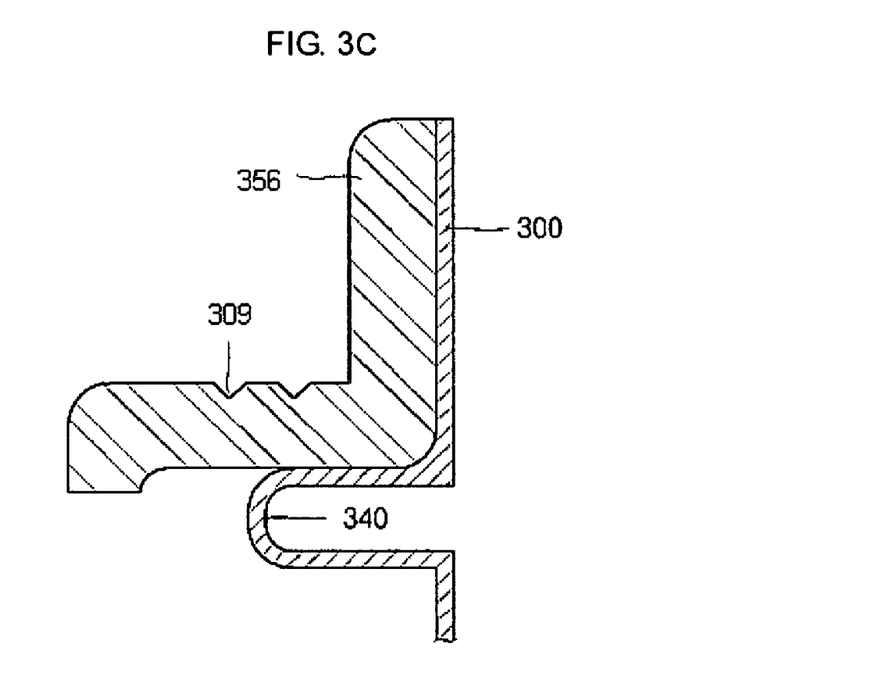
FIG. 3C is a sectional view showing a gasket according to another aspect of the present invention.
Figure 4:
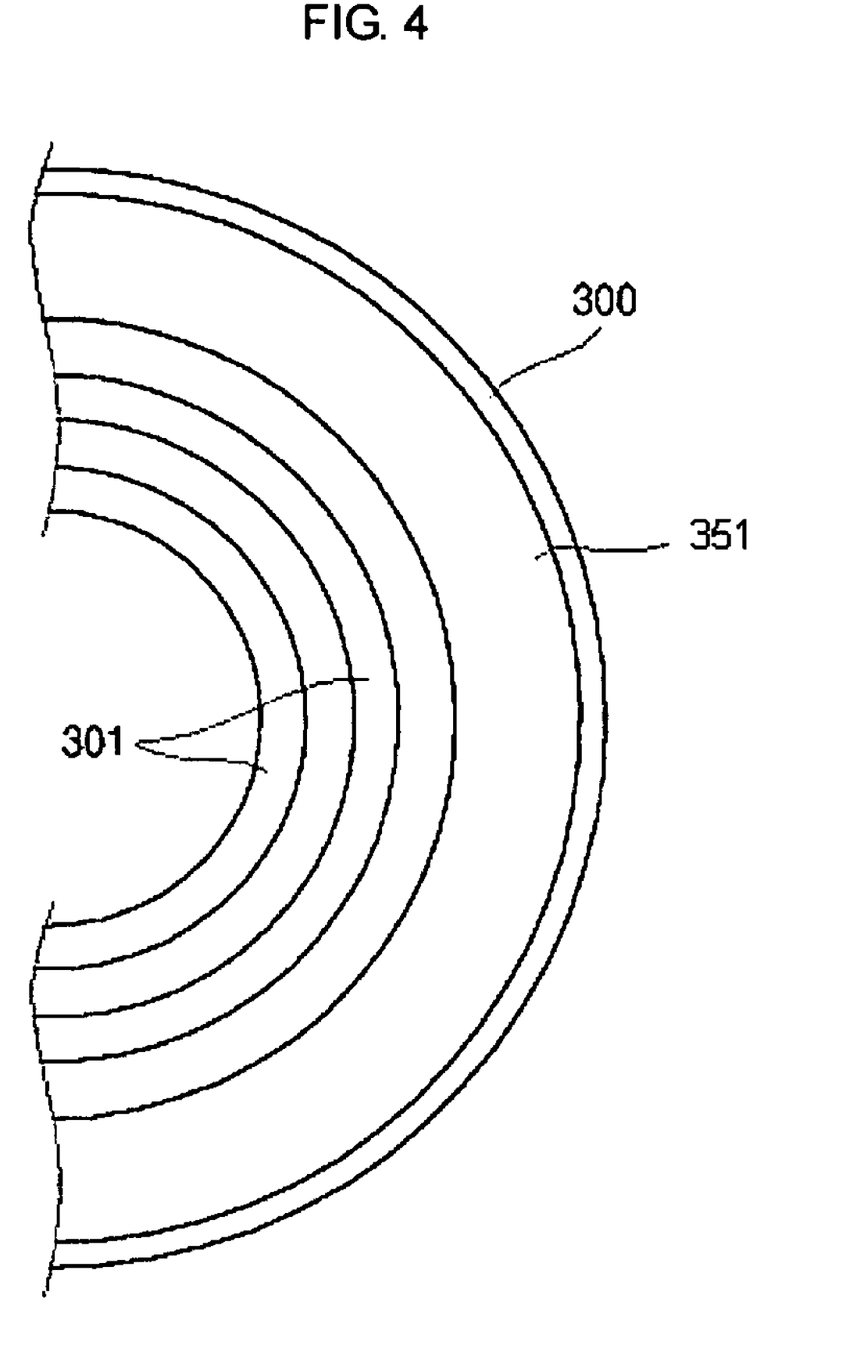
FIG. 4 is a top view showing a gasket according to another aspect of the present invention.
Figure 5:
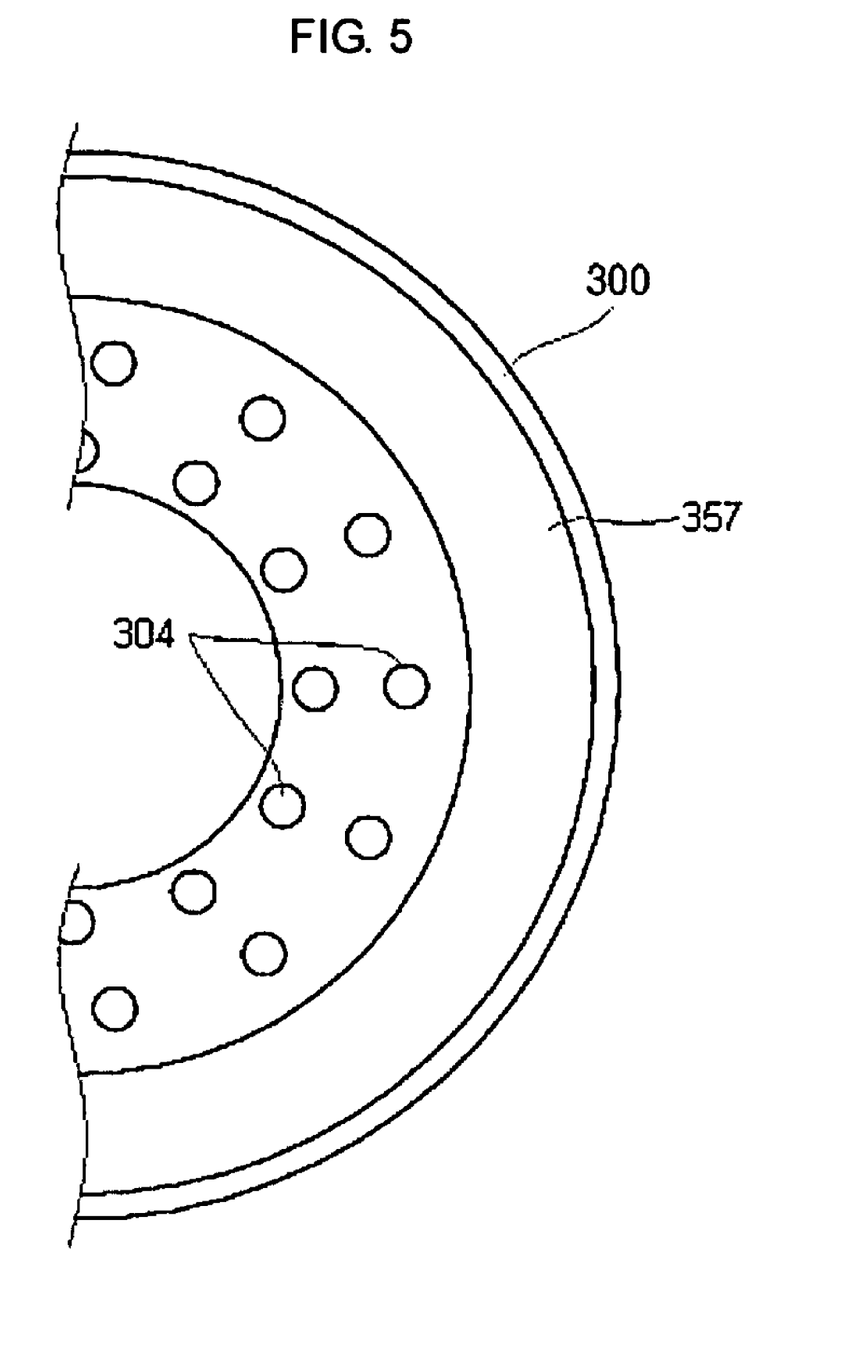
FIG. 5 is a top view showing a gasket according to another aspect of the present invention.
Figure 6:
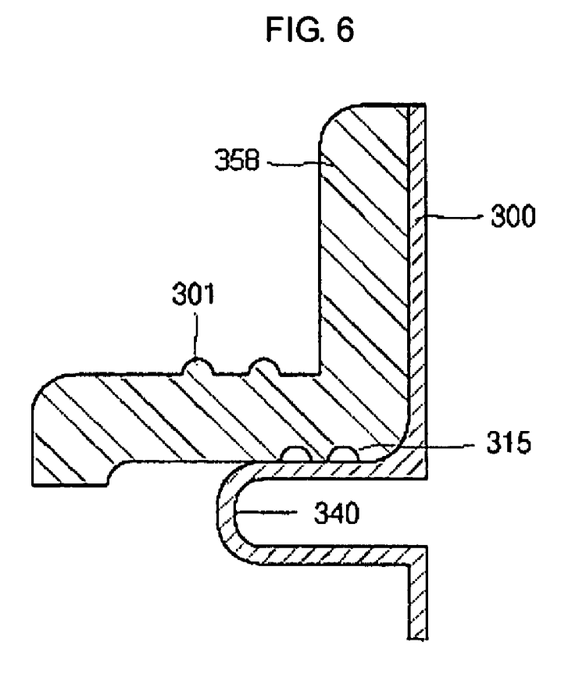
FIG. 6 is a sectional view showing a gasket according to another aspect of the present invention.
Figure 7:
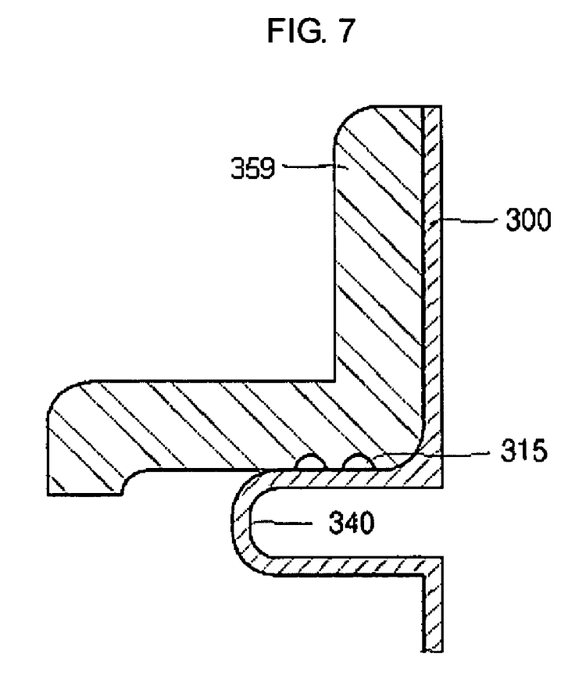
FIG. 7 is a sectional view showing a gasket according to another aspect of the present invention.

FIGS. 2A, 2B, and 2C are sectional views showing gaskets according to various aspects of the present invention. FIGS. 3A, 3B, and 3C are sectional views showing gaskets according to other various aspects of the present invention. FIG. 4 is a top view showing a gasket according to an aspect of the present invention. FIG. 5 is a top view showing a gasket according to another aspect of the present invention. FIG. 6 is a sectional view showing a gasket according to another aspect of the present invention. FIG. 7 is a sectional view showing a gasket according to another aspect of the present invention. For the sake of clarity, the drawings show gaskets and cans before crimping is performed.

Referring to FIG. 1, a cylinder-type lithium secondary battery 100 includes an electrode assembly 200, a cylindrical can 300 for containing the electrode assembly 200 together with an electrolyte, and a cap assembly 400 assembled to the top of the cylindrical can 300 so as to seal it and allow current, which is generated by the electrode assembly 200, to flow to an external device.

The electrode assembly 200 is formed by winding a positive electrode plate 210, which has a positive electrode collector coated with positive electrode active materials on its surface, a negative electrode plate 220, which has a negative electrode collector coated with negative electrode active materials on its surface, and a separator 230, which is positioned between the positive and negative electrode plates 210 and 220 so as to electrically insulate them from each other, into a jelly roll.

The cylindrical can 300 includes a cylindrical lateral plate 310 having a predetermined diameter so as to define a space for receiving the cylindrical electrode assembly 200 and a lower plate 320 for sealing the bottom of the cylindrical lateral plate 310. The cylindrical lateral plate 310 has an open top so that the electrode assembly 200 can be inserted through it. The cylindrical shape of the can 300 and the electrode assembly 200 is not required in all aspects of the present invention. Thus, it is understood that the can 300 may have any form as long as it is able to contain the electrode assembly 200. Accordingly, the can 300 and the electrode assembly 200 may have a columnar shape, or may also be a parallelopiped, for example.

The cap assembly 400 includes a safety vent 410, a current interruptor 420, a secondary protective device 480, and a cap-up 490.

Referring to each FIG. 2A through FIG. 3C, gaskets 351-356 according to various aspects of the present invention are seated on a beading portion 340 of the can 300. The gaskets 351-356 have corresponding protrusions 301-303 (FIGS. 2A-2C) or corresponding depressions 307-309 (FIGS. 3A-3C) formed on a part thereof, to which the safety vent 410 (or an indicator) is fastened, attached and/or otherwise contacted. In the aspects shown, the gaskets (351-356) are formed annularly in an inside surface or inside surfaces of the corresponding can 300 at the plate 310. In the aspects shown, the protrusions 301-303 are formed in an inner surface of the corresponding gaskets 351-356.

The protrusions 301-303 may have a semi-circular shape (or profile) as shown in FIG. 2A, a rectangular shape (or profile) as shown in FIG. 2B, or a triangular shape (or profile) as shown in FIG. 2C, when viewed in cross section. The depressions 307-309 may have a semi-circular shape (or profile) as shown in FIG. 3A, a rectangular shape (or profile) as shown in FIG. 3B, or a triangular shape (or profile) as shown in FIG. 3C, as in the case of the protrusions 301, when viewed in cross section. However, the shape (or profile) of the protrusions 301-303 and the depressions 307-309 is not limited to that in the present invention, and may include others, such as an oval, saw-toothed, and/or bellow-shaped shape or profile, and may be variously modified by those skilled in the art.

Referring to FIG. 4, in the aspect shown, the protrusions 301 (and/or similarly with the depressions 307) are configured annularly on the gasket 351. Therefore, in the aspect shown in FIG. 4, they are shown as circles having a predetermined radius about a rotation center axis of the battery. Although not required in all aspects, the protrusions 301-303 (and/or similarly with the depressions 307-309) have the shape of two concentric circles formed on a surface of the corresponding gaskets 351-356, to which the safety vent 410 is fastened, attached and/or otherwise contacted.

In various aspects of the present invention, at least two of the protrusions 301-303 and/or depressions 307-309, and/or any combination thereof may be formed.

When only one of the protrusions 301-303 and/or depressions 307-309 is formed, the fastening properties between the corresponding one of the gaskets 351-356 and the safety vent 401 may need to be improved. Therefore, at least two of the protrusions 301-303 and/or depressions 307 are preferably formed, though not required. Troughs are formed between the protrusions 301-303 with a predetermined width when there are at least two of the protrusions 301-303. The troughs act similarly to the depressions 307-309 when the corresponding one of the gaskets 354-356 and the safety vent 410 are fastened, attached and/or otherwise contacted to each other. This improves the sealing properties. The depressions 307-309 act as a path, along which a leaking electrolyte passes. Therefore, at least two of the depressions 307-309 are preferably formed, though not required in all aspects, as in the case of the protrusions 301-303, so that the leaking electrolyte travels along an extended path. In other aspects of the present invention, the troughs formed between protrusions 301-303 and/or the depressions 307-309 act as reservoirs that collect gas and/or electrolyte so that leakage of gas or electrolyte is lessened and/or prevented.

Referring to the aspect of the present invention of FIG. 5, the protrusions and/or the depressions are configured as embossments 304. Although the embossments 304 are arranged along two circles and form two rings as shown in FIG. 5, the arrangement is not limited to that herein. For example, the embossments 304 may be arranged in a zigzag, and/or the number of the embossments 304 may be increased or decreased, which is within the scope of the present invention. Although not required in all aspects, the embossments 304 may be formed along with any number of the protrusions 301-303 and/or any number of depressions 307-309, in any arrangement, on any one of the gaskets 351-357. Although not required in all aspects, any number of the protrusions 301-303, embossments 304, and/or depressions 307-309 may be formed anywhere on the surface of one of the gaskets 351-356, for example, the inner surface, toward the bottom of one of the gaskets 3351-356 away from the opening of the can 300, toward the top of one of the gaskets 351-356 near the opening, in the middle of one of the gaskets 351-356, or any combination thereof.

Referring to the aspect of the present invention of FIG. 6, protrusions 301 and/or depressions 315 may be additionally formed on a part of the lower surface of the gasket 358, which makes contact with the bead 340. In the aspect of the present invention as shown in FIG. 6, the gasket 358 has protrusions 301 formed on a part, to which the safety vent 410 is fastened, attached, and/or otherwise contacted, and depressions 315 formed on another part, to which the bead 340 is fastened, attached, and/or otherwise contacted.

Referring to the aspect of the present invention of FIG. 7, the protrusions 301-303 or the depressions 315 are solely formed on a part of the lower surface of the gasket 359, which makes contact with the bead 340. Particularly, only depressions 315 are formed, as shown in FIG. 7. The protrusions 301-303 or the depressions 315 may be configured annularly on the gasket 359. Therefore, they are shown as circles having a predetermined radius about the rotation center axis of the battery, as in the case of FIG. 4. Further, the protrusions 301-303 or the depressions 315 may be configured as embossments 304, as in the case of FIG. 5. Though not required in all aspects, the protrusion 301-303 and the depressions 315 may be formed along with any number of the protrusions 301-303 and/or any number of depressions 315, in any arrangement, on the gasket 359. Although not required in all aspects, any number of the protrusions 301-303, embossment 304, and/or depressions 315 may be formed anywhere on any surface of the gasket 359, toward the bottom of the gasket 359 away from the opening of the can 300, toward the top of the gasket 359 near the opening, in the middle of the gasket 359, or any combination thereof.

The sectional shape of the protrusions 301-303 or the depressions 307-309, 315 may be any one of a semi-circle, a rectangle, and a triangle, as shown variously in FIG. 2A, 2B, 2C, 3A, 3B, or 3C, but the shape is not limited only to those shown in the discussed aspects of the present invention. For example, shapes or profiles such as an oval, saw-toothed, and/or bellow-shaped are within the scope of the present invention.

Any one of the gaskets 351-359 may be made of any one of polyethylene (PE), polypropylene (PP), and polyimide (PI), or any combination thereof, and/or any other material.

Polyethylene has a low density (i.e. it is light) and is malleable, due to loose molecular arrangement. It has a relative low tensile strength, but strong resistance to impact (i.e. it has good workability). It has good electric insulation properties because it is solely composed of $CH_2$. Due to its symmetry about the C chain, as is clear from the structural formula, it can be used as a high-frequency insulation material.

Polypropylene is obtained together with ethylene by decomposing naphtha. It has an isotactic structure, wherein methyl groups are uniformly arranged in the same direction, for example. It has a high degree of crystallinity, which decreases after being shaped. Electric properties of polypropylene and polyimide are similar to those of polyethylene.

The operation of a lithium secondary battery, which has a gasket inserted therein according to an aspect of the present invention, will now be described.

When any one of the gaskets 351-359 and the safety vent 410 are fastened, attached, or otherwise contacted to the crimp near the upper opening of the can, the protrusions 301-303 and/or the depressions 307-309 (shown in FIG. 2A or 3A) are fastened, attached, or otherwise contacted to the lower side of the safety vent 410. Even when gas is generated inside the battery and reaches a narrow gap between any one of the gaskets 351-359 and the safety vent 410, it cannot travel any longer, because the protrusions 301-303 and/or the depressions 307-309 on any one of the gaskets 351-359 are tightly fastened, attached, or otherwise contacted to the surface of the safety vent 410. This prevents the gas from leaking out of the battery.

When the electrolyte reaches the narrow gap between any one of the gaskets 351-359 and the safety vent 410, it gradually rises along the gap, due to the cohesion force among molecules of the electrolyte or a capillary phenomenon. When the electrolyte reaches the surface of the safety vent 410, to which the protrusions 301-303 and/or the depressions 307-309 on any one of the gaskets 351-359 are tightly fastened, the electrolyte does not escape the battery, but travels along a longer path, which has been extended by the presence of protrusions 301-303 or the depressions 307-309.

The same description holds when the protrusions 301-303 and/or the depressions 315 (shown in FIG. 6 or 7) are formed on a part of the lower surface of any one of the gaskets 358-359, which makes contact with the bead 340.

As mentioned above, the lithium secondary battery according to the present invention is advantageous in that it has protrusions and/or depressions formed on a surface and/or surfaces of the gasket, which makes contact with the safety vent and/or the bead, so that gas, which is generated inside the battery, or the electrolyte, which has been injected into the battery, do not leak, thereby improving the safety and sealing properties of the battery. It is also understood that any type of battery is within the scope of the present invention, and any type of battery may include the protrusions 301-303, embossments 304, depressions 307-309, 315, and/or any other structures or elements described above.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A lithium secondary battery, comprising:
   an electrode assembly;
   a can to contain the electrode assembly, having an opening;
   a safety vent disposed in the opening of the can, over the electrode assembly, having an inner surface that faces the electrode assembly;
   a gasket positioned between the safety vent and the can, so as to maintain a seal, the gasket having a protrusion and/or depression formed on a first surface of the gasket, the first surface being in direct contact with, and completely covered by, the inner surface safety vent, such that the protrusion and/or depression extends directly toward or away from the inner surface of the safety vent, respectively.

2. The lithium secondary battery as claimed in claim 1, wherein the protrusion and/or depression has a shape of a circle having a predetermined radius about a rotation center axis of the battery.

3. The lithium secondary battery as claimed in claim 2, wherein at least two of the protrusions and/or depressions are formed.

4. The lithium secondary battery as claimed in claim 1, wherein the protrusion and/or depression has a shape of an embossment.

5. The lithium secondary battery as claimed in claim 2, wherein the protrusion and/or depression has a sectional shape selected from a semi-circle, a rectangle, and a triangle.

6. The lithium secondary battery as claimed in claim 1, further comprising a bead, wherein the gasket has another protrusion and/or depression formed on a second surface of the gasket that directly contacts the bead.

7. A lithium secondary battery comprising:
   an electrode assembly;
   a can to contain the electrode assembly, and comprising a bead;
   a safety vent disposed over the electrode assembly, having an inner surface that faces the electrode assembly;
   a gasket positioned between the safety vent and the can, so as to maintain a seal, the gasket having a protrusion and/or depression formed on a first surface of the gasket that directly contacts, and is completely covered by, the bead, such that the protrusion and/or depression extends directly toward or away from the bead, respectively.

8. The lithium secondary battery as claimed in claim 7, wherein the protrusion and/or depression has a shape of a circle having a predetermined radius about a rotation center axis of the battery.

9. The lithium secondary battery as claimed in claim 8, wherein at least two protrusions and/or depressions are formed.

10. The lithium secondary battery as claimed in claim 7, wherein the protrusion and/or depression has a shape of an embossment.

11. The lithium secondary battery as claimed in claim 7, wherein the protrusion and/or depression has a sectional shape selected from a semi-circle, a rectangle, and a triangle.

12. The lithium secondary battery as claimed in claim 1, wherein the gasket is made of a material selected from polyethylene, polypropylene, and/or polyimide.

13. The lithium secondary battery as claimed in claim 7, wherein the gasket is made of a material selected from polyethylene, polypropylene, and/or polyimide.

14. A battery, comprising:
   a container including an open first end and a closed second end;
   a cap assembly disposed in the first end of the container, having an inner surface that faces the second end of the can; and
   a gasket positioned between the cap assembly and the container, to seal the container, the gasket having:

at least one protrusion and/or depression formed on a first surface of the gasket that directly contacts the inner surface of the cap assembly; and at least one protrusion and/or depression formed on a second surface of the gasket that directly contacts the bead.

15. The battery as claimed in claim 14, wherein the protrusions and/or the depressions have a sectional shape selected from a semi-circle, a rectangle, and a triangle.

16. The battery as claimed in claim 14, wherein the gasket is made of a material selected from polyethylene, polypropylene, and/or polyimide.

17. The battery as claimed in claim 14, wherein the at least one protrusion and/or depression tightly fastens, attaches, or otherwise contacts the gasket to the container and/or the gasket to the cap assembly.

* * * * *